United States Patent [19]

Roll et al.

[11] Patent Number: 4,658,140

[45] Date of Patent: Apr. 14, 1987

[54] INFRARED SCANNER FOR FORWARD LOADING INFRARED DEVICE (FLIR)

[75] Inventors: Walter F. Roll, Blue Ridge; Anthony R. Thedford, Richardson, both of Tex.

[73] Assignee: Texas Instruments Incorporated, Dallas, Tex.

[21] Appl. No.: 736,025

[22] Filed: May 20, 1985

[51] Int. Cl.[4] ............................................. G02B 26/10
[52] U.S. Cl. .................................... 250/347; 250/334;
350/6.6
[58] Field of Search ........................ 250/334, 347, 330;
350/6.6, 6.5, 6.91, 486

[56] References Cited

U.S. PATENT DOCUMENTS 3,742,238  6/1973  Hoffman, II ...................... 250/332

FOREIGN PATENT DOCUMENTS 750415  7/1980  U.S.S.R. ............................... 350/6.6

OTHER PUBLICATIONS

P. J. Beckwith, "A Vibrating Mirror System Suitable for Q-Switching Large-Aperture Lasers" Dept. of Defence Materials Research Laboratories, Melbourne, Victoria, Australia [AU] Report MRL-R-700 (Nov. 1977) 16 pp.

*Primary Examiner*—Janice A. Howell
*Assistant Examiner*—Constantine Hannaher
*Attorney, Agent, or Firm*—Richard K. Robinson; Leo N. Heiting; Melvin Sharp

[57] ABSTRACT

An infrared scanner includes an infrared energy reflecting surface rigidly fixed to a supporting shaft. The shaft is supported by jewel bearings for rotation by a motor controlled by a control circuit for imparting a scanning motion to the reflecting surface. A collar interconnects the shaft to an electrical coil which is energized by a two-directional source of power. A magnetic means includes a pair of "U" shaped members forming a housing of electromagnetic material for containing a pair of opposing magnets. The legs of the "U" shaped members support a coil pole in an air gap forming relationship with respect to the magnets. The reflecting surface support shaft supports the coil about the center pole piece and in the air gap in a free standing position with respect to the center pole piece and the magnets whereby the coil that is attached to the shaft moves through the air gap due to the interaction of the fixed magnetic field with that associated with the current flowing through the scan coil to rotate the supporting shaft and the scan mirror.

10 Claims, 7 Drawing Figures

INFRARED SCANNER FOR FORWARD LOADING INFRARED DEVICE (FLIR)

This invention relates to an optical system and more particularly to an apparatus for scanning infrared energy.

In the past infrared scanners have included scan mirrors mounted on gimbal mounts. Small brushless dc torque motors having rotors and stators with the stators attached to mirror clamps which clamp the mirrors to the rotors drive the mirrors and are referred to as the scan drivers. Threaded couplers secure the rotors to bearings or flex pivots. Such scanners are more fully described in U.S. Pat. No. 3,742,238 issued June 26, 1973 to Richard G. Hoffman III. Although this prior art optical scanner is ideal for some applications, its physical size and cost precludes its use in many applications where size and cost are use determining factors. Further, the linearity and efficiency of the device preclude its use in applications involving, for example, the tracking of multiple targets. Linearity is a function of the velocity of the scan mirror and efficiency is a function of the amount of cycle time the detector is exposed to the infrared energy by the scanner during its cycle. The prior art device being spring loaded for assistance in the return portion of the cycle has a non-constant velocity which reduces the linearity portion of the cycle curve. Also, as the linearity portion of the curve is limited, the available time of each cycle for scanning is reduced thereby reducing the efficiency of the prior art device.

Accordingly, it is an object of this invention to provide an infrared scanner which is smaller in size and weight, has a minimum number of parts as well as a minimum number of moving parts.

Another object of the invention is to provide a low cost scanner for a low cost forward looking infrared (FLIR) device.

A further object of the invention is to provide an infrared scanner having improved linearity and efficiency.

Briefly stated the invention comprises a scanning mirror driven by a scan coil.

Other objects and features of the invention will become more readily apparent and understood from the following detailed description of the invention when read in light of the drawings in which.

Figure 1:
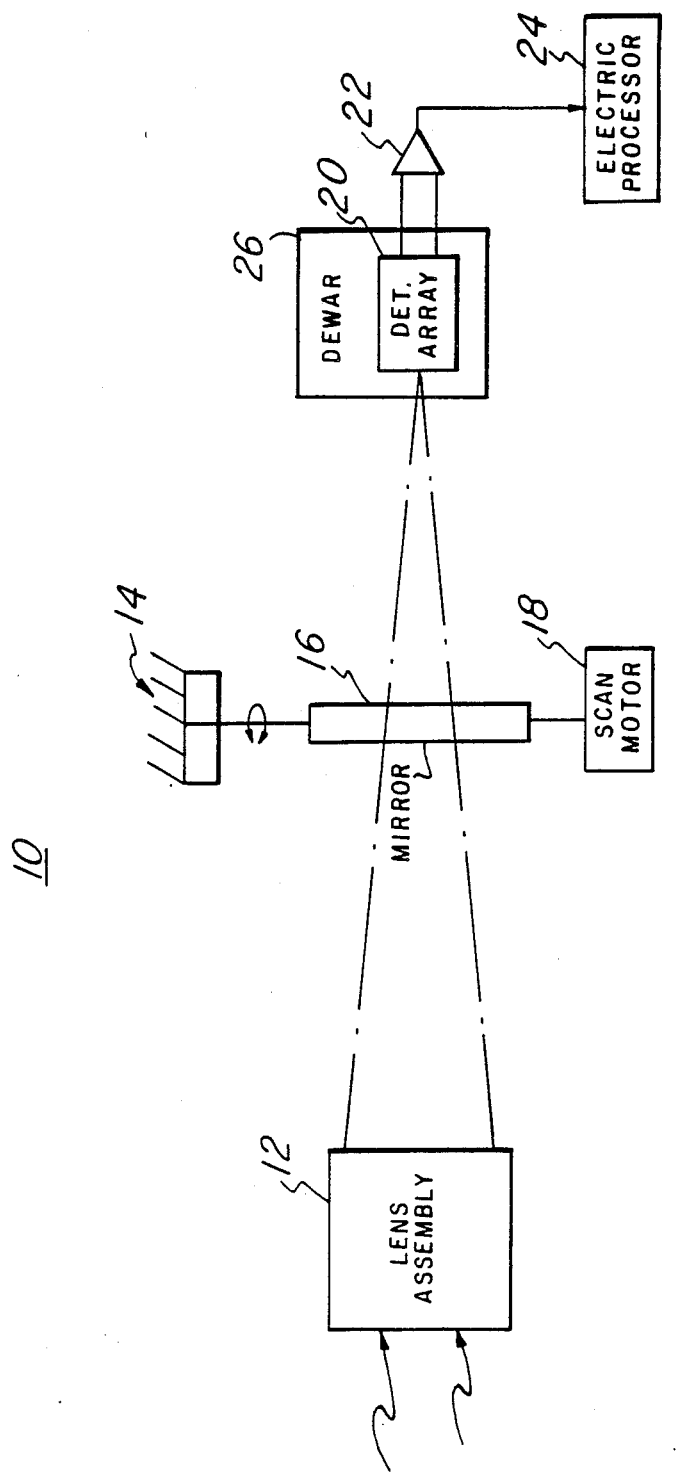
FIG. 1 is a block diagram of a forward looking infrared (FLIR) device.

Referring now to FIG. 1, a forward looking infrared energy system 10 is comprised of a lens assembly 12, a scanning assembly 14, a detector assembly 20, preamplifier 22 and an electronic processor 24. The lens assembly, for operation in the infrared region, may consist of germanium elements. Incoming infrared energy from a target enters along the optical axis of the system, passes through the lens assembly 12 and impinges upon the mirror 16 of scanner assembly 14, hereinafter described in detail and a scan motor 18 rotates the scan mirror 16 for scanning the focused infrared energy across the array of detectors of the detector assembly 20. The detectors are located in a Dewar 26 for cooling. The array of detectors may be, for example, a linear array of mercury cadmium, telluride (HgCdTe) elements. Those persons skilled in the art desiring a more detailed description of a FLIR device are referred to U.S. Pat. No. 3,742,328 issued June 26, 1973, to Richard G. Hoffman III.

Figure 2:
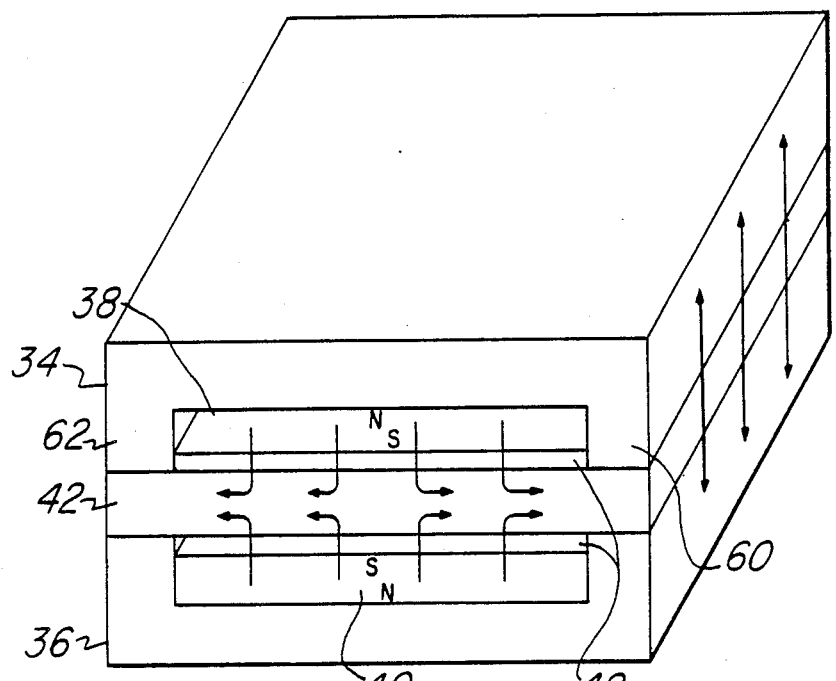
FIG. 2 is an isometric view of the coil/mirror assembly of the scan mirror driver with the coil/mirror assembly removed.
Figure 3:
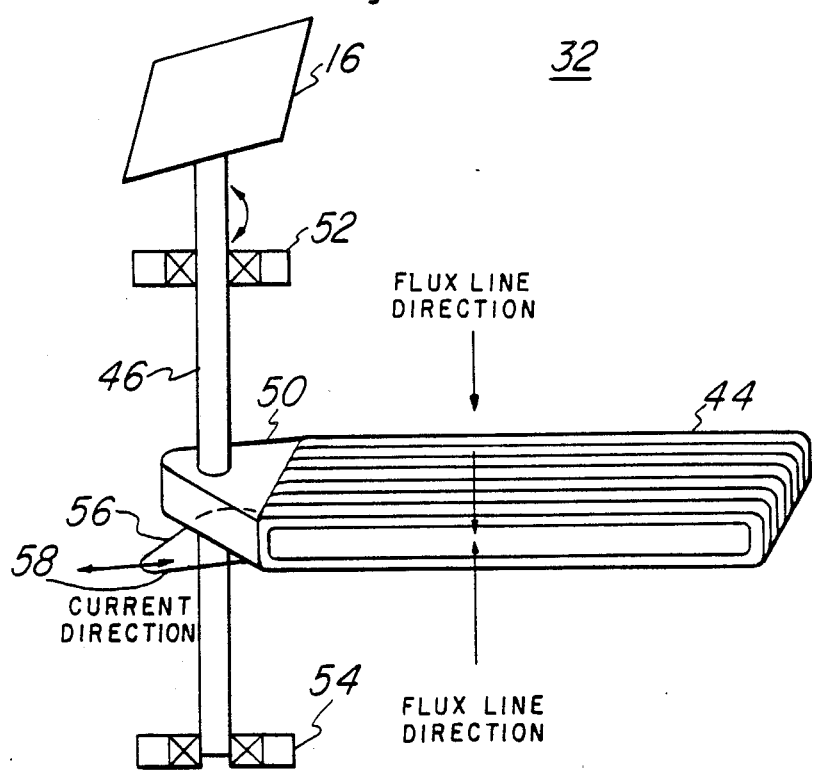
FIG. 3 is an isometric view of the coil/mirror assembly for the scan mirror driver.

Referring now to FIGS. 2 and 3, the scanning assembly 14 (FIG. 1) utilizes a scan coil technique in which a magnetic field apparatus 30 (FIG. 2) is combined with a coil/mirror support device 32 (FIG. 3) to provide the function of the scan motor 18 (FIG. 1) for rotating the scan mirror 16.

The magnetic field producing apparatus 30 (FIG. 2) includes, for example, "U" shaped housings 34 and 36 of magnetic material such as, for example, a high permeability alloy such as that sold under the trademark High Permeability "49" by Carpenter Steel Company. The legs of the "U" shaped housings 34 and 36 define opposing cavities in which magnets 38 and 40 are mounted with facing spaced South pole surfaces. The magnets are, for example, of a rare earth permanent material sold under the trademark Hicore by Hitachi Magnetics Corporation. The cavity forming legs are spaced from a center pole 42 about which a free standing coil 44 (FIG. 3) is positioned by a mirror support shaft 46. The center pole or core 42 and magnets 38 and 40 define an air gap 48 (FIGS. 3, 4, and 5) in which the coil 44 is free to move, i.e., not make contact with center core or magnets. The center pole 42 is preferably made of a vanadium alloy sold under the trademark Vanadium Permendur sold by Allegheny Ludlum Steel Corp. because of its high flux line carrying capacity.

Referring now to FIG. 3, the coil 44 is fixed to a collar member 50 through which the support shaft 46 passes. The collar 50 is rigidly attached to the shaft 46. The shaft 46 is journaled in bearings 52 and 54 and supports the mirror 16. The mirror 16 is rigidly attached to the end of the shaft 46 for rotation therewith. The shaft 46 is preferably a stainless steel rod and the bearings are, for example, jewel bearings. However, if the shaft is made of an electromagnetic material, the shaft must be supported by the collar 50 outside the magnetic flux field of the housing 30. The coil 44 has leads 56 and 58 for connection to a source of two directional current. A sensing cam 64 (FIG. 4) of magnetic material is attached by screw 66 to the mirror support shaft 46. An electromagnet type sensor 68 is positioned adjacent to the sensing cam 64. In operation, as the sensing cam 64 rotates with shaft 50 the resistance of electromagnetic sensor 68 varies to provide a voltage output for processing by a mirror position determining and control circuit 70, hereinafter described.

Figure 4:
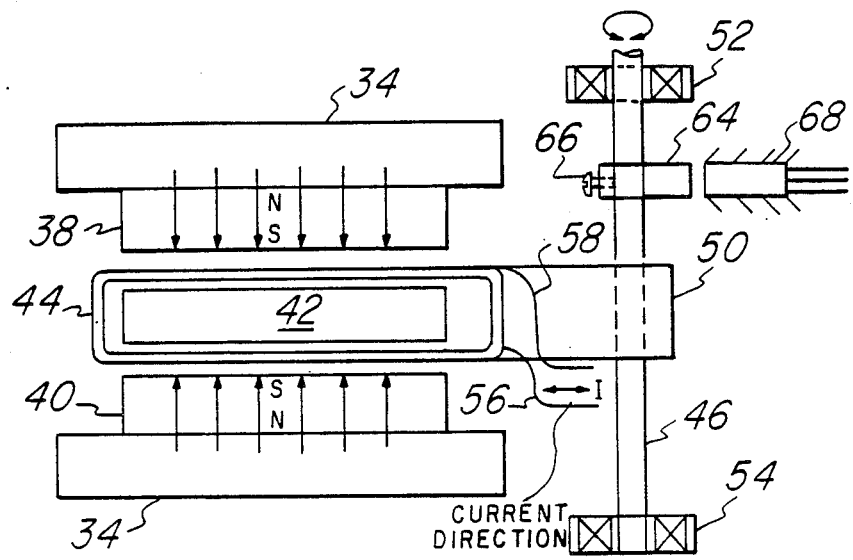
FIG. 4 is a side view of the scan mirror driver.
Figure 5:
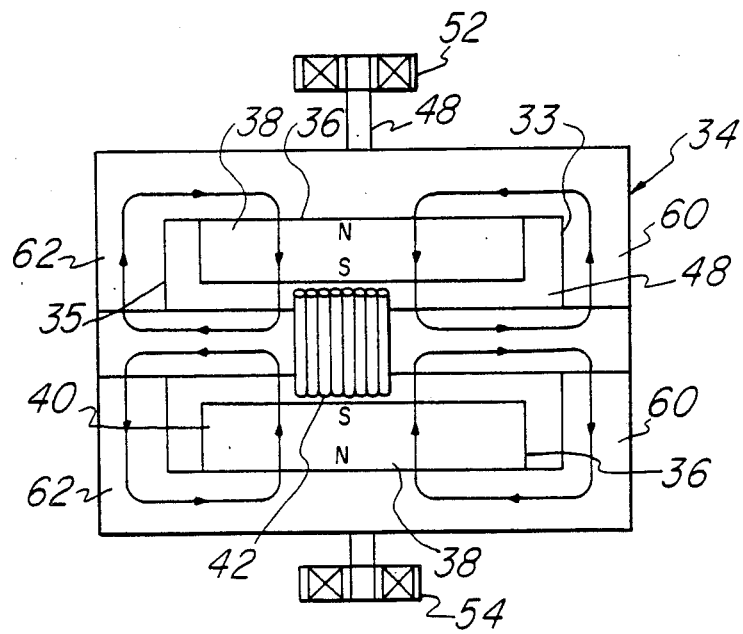
FIG. 5 is a front view of the scan mirror driver.

The interaction of the fixed magnetic field with the two directional current in the coil produces a coil movement as follows. The magnetic flux field is shown in FIGS. 2, 3, 4 and 5. At the center pole's support legs 60 and 62, the flux lines pass from South to North from the center pole 42 ends along the webs of the "U" members of the magnetic housings 34 and 36 (FIGS. 2 and 4). The flux lines then flow from the North surfaces to the South surfaces of magnets 38 and 40 across the air gap 48 into the center pole 42 (FIGS. 2 and 5) to form the four flux patterns shown in FIG. 5.

With the flux direction vertical to the coil 44 (FIG. 4), current flow is normal to the flux lines in both directions. With the mirror supporting shaft rigidly attached to the coil and the mirror support shaft free only to rotate in the bearings 52 and 54, the coil movement in the air gap 48 is translated into shaft rotation moment forces to oscillate the mirror support shaft 46 for producing the mirror scanning motion. It will be appreciated by those persons skilled in the art that the length of the scanning motion is determined by the current flow and no stops are required to limit the coil's motion in the air gap.

Figure 6A:
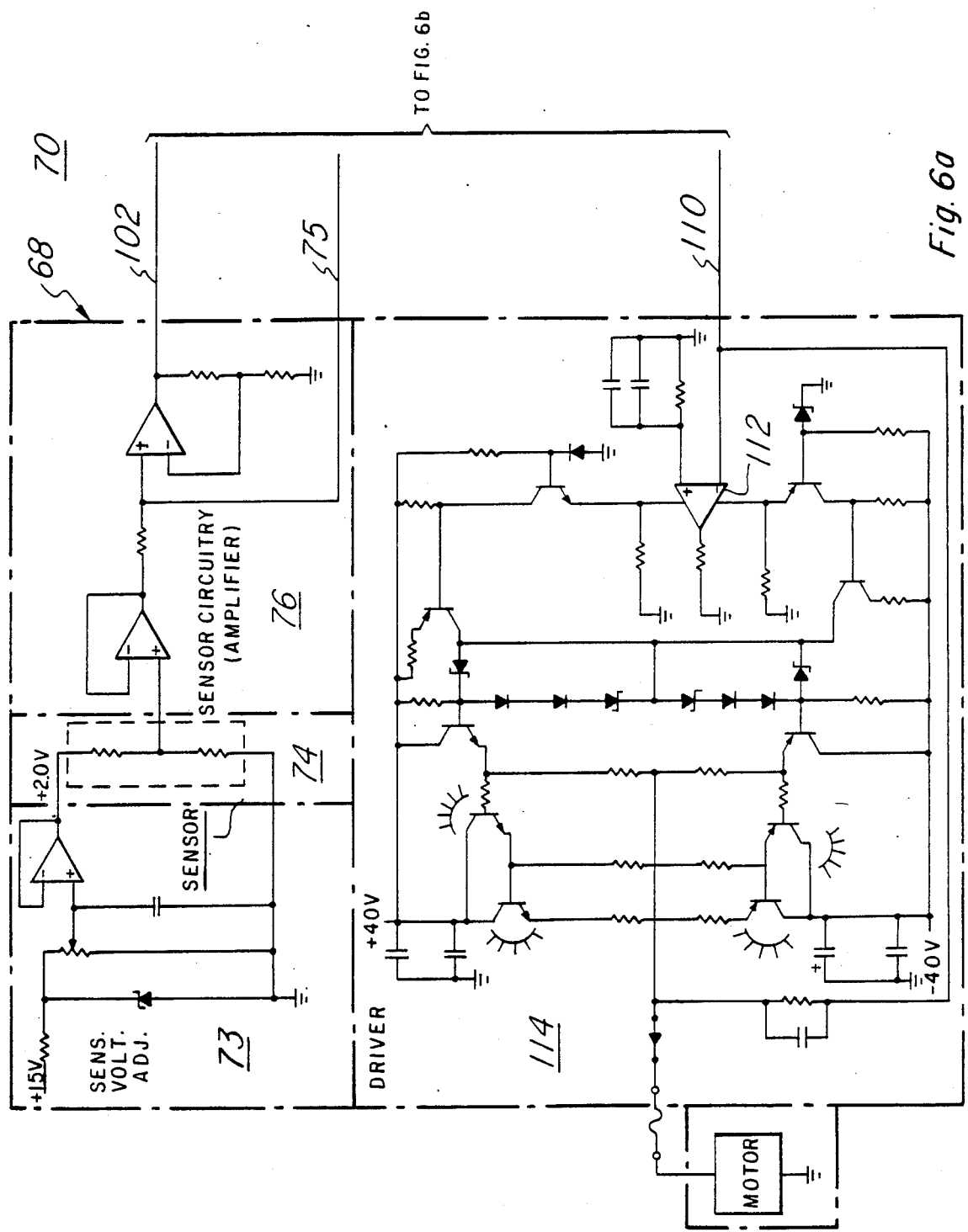
FIGS. 6a and 6b are a schematic/block diagram of the electronic controller for the infrared scanner.
Figure 6B:
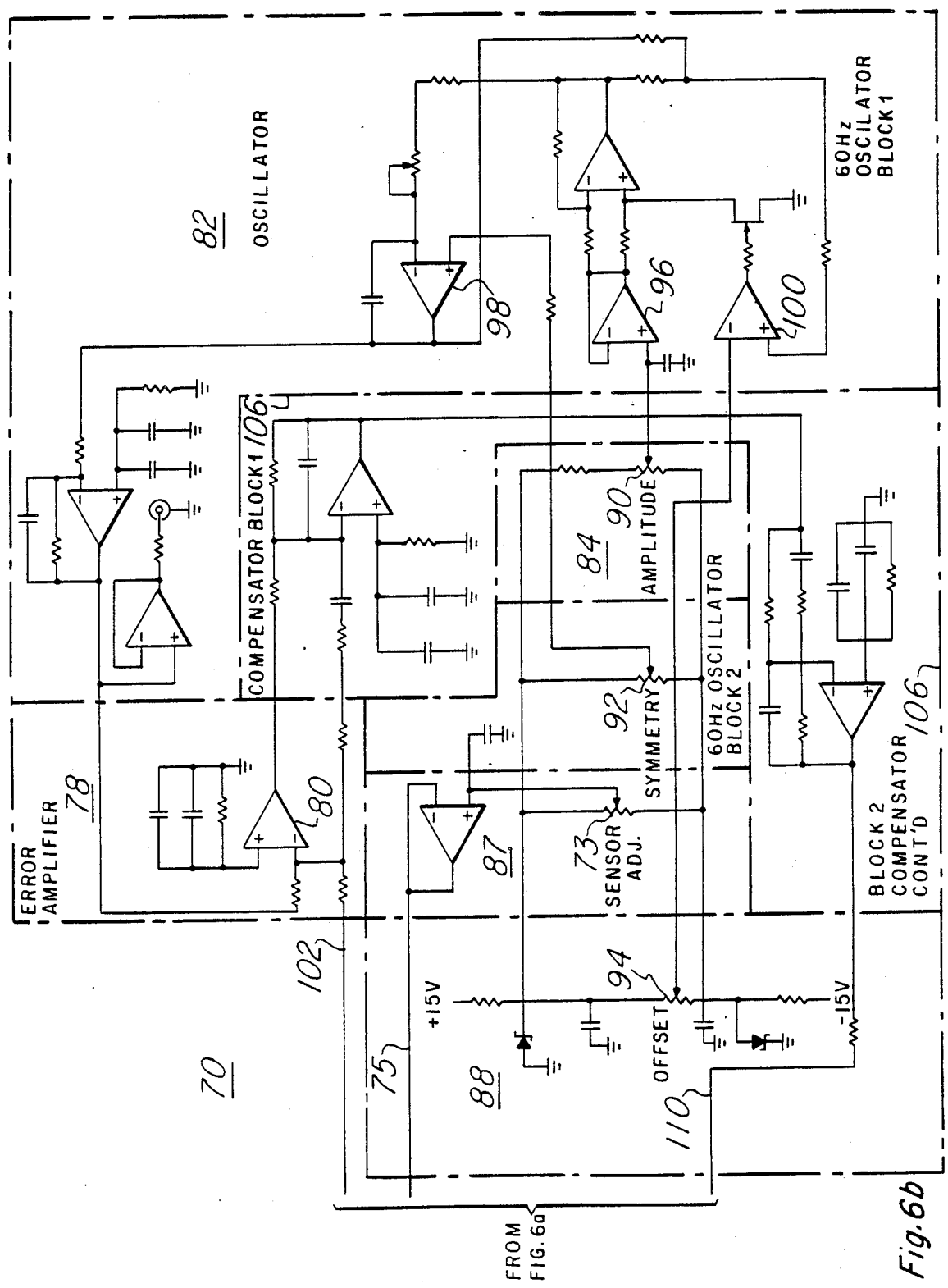

The control system 70 (FIGS. 4, 6a and 6b) has its sensor magnet 64 (FIG. 4), attached to mirror drive shaft 46, driven by motor 72 (FIG. 6a). The sensor 68 includes a voltage adjust circuit 73, sensor 74, and preamplifier 76. The voltage adjust circuit is used to synchronize the sensor and the mirror. The voltage output of the sensor 68 is a measure of the mirror movement in degrees with a preselected value used to indicate when the mirror is normal to the centerline of the optical path. The sensor 68 detects mirror scan movement from left to right and provides an increasing positive voltage output therefor; then for right to left scan movement the sensor outputs a decreasing positive voltage representative thereof. The mirror position voltage output of the sensor 68 is added through lead 75 to the adjustment voltage of potentiometer 73 of the sensor adjust circuit 87 and amplified to a working level by the preamplifier 76. The gain of the position sensor/amplifier combination is 1. Therefore the angular movement of the mirror is equal to 1 Radian per input volt to the error amplifier 78.

An error amplifier circuit 78 includes a difference amplifier 80 having its negative input terminal connected to the junction of oscillator 82 and sensor 68 for receiving, respectively, the reference position waveform of the oscillator and the sensor output and its positive input terminal connected through an RC circuit to ground for establishing a reference value.

The oscillator 82 is a 60 Hz triangular wave oscillator having its frequency adjusted by an amplitude control circuit 84, symmetry circuit 86 and offset circuit 88; these circuits include, respectively, potentiometers 90, 92 and 94 connected to operational amplifiers 96, 98 and 100 of oscillator 82.

The output of the error amplifier 78 is connected to the input of a difference amplifier 104 of compensator 106. The compensated output of compensator 106 is connected by lead 110 to difference amplifier 112 of motor drive circuit 114, which determines the direction of travel and outputs motor driving signals for controlling the movement of the motor 72, thereby synchronizing movement of the scanning mirror and motor rotation, thereby preventing any contact of the moving parts for improving the mean time before failure factor and improving the linear portion and efficiency of the operating cycle.

Although only a single embodiment of the invention has been described, it will be apparent to a person skilled in the art that various modifications to the details of construction shown and described may be made without departing from the scope of the invention.

What is claimed is:

1. An apparatus for scanning infrared energy comprising a reflecting surface having a predetermined path of rotation, reflecting surface actuating means for actuating said reflecting surface to a location anywhere along said path of said reflecting surface, magnetic means for driving said reflecting surface and error determining means responsive to predetermined signals received from said reflecting surface for continuously controlling the position at all points along said path of said reflecting surface by controlling said reflectiing surface actuating means to control the position of said reflecting surface along said path.

2. An apparatus for scanning infrared energy according to claim 1 wherein the reflecting surface is a mirror.

3. An apparatus for scanning infrared energy according to claim 1 wherein the reflecting surface actuating means includes a rotatable support shaft for rotating the reflecting surface in the optical path of the infrared energy, a coil means including an electrical coil and a collar interconnecting the coil and the support shaft and leads connected to the coil for connection to a source of two way current.

4. An apparatus for scanning infrared energy comprising, a reflecting surface, reflecting surface actuating means for actuating said reflecting surface and a magnetic means for driving said reflecting surface actuating means, said reflecting surface actuating means including a rotatable support shaft for rotating the reflecting surface in the optical path of the infrared energy, said magnetic means including coil means including an electrical coil and a collar interconnecting said coil and said support shaft and leads connected to said coil for connection to a source of bidirectional current, wherein the reflecting surface actuating means further includes a motor operatively connected to the rotatable support shaft and a control circuit operatively connected to the motor for controlling the scan velocity and degrees of rotation of the reflecting surface.

5. An apparatus for scanning infrared energy according to claim 4 wherein the control circuit includes means to determine the position of said shaft, oscillator means to provide a source of oscillatory signals, error amplifying means responsive to said shaft position determining means and said oscillator means to provide an error signal, said oscillator means having offset, symmetry and amplitude frequency adjustment means for providing scanning velocity and degree of rotation information to the oscillator for frequency correction, compensator means operatively connected to said shaft position determining means and error amplifier to determining correct driving signals, driver means operatively connected to said compensator means for determining the rotational direction and outputting motor drive signals, and a motor operatively connected to the driver means for driving said scanner reflecting surface in response to the motor driving signals.

6. An apparatus for scanning infrared energy comprising, a reflecting surface, reflecting surface actuating means for actuating said reflecting surface and a magnetic means for driving said reflecting surface actuating means, said reflecting surface actuating means including a rotatable support shaft for rotating the reflecting surface in the optical path of the infrared energy, said magnetic means including coil means including an electrical coil and a collar interconnecting said coil and said support shaft and leads connected to said coil for connection to a source of bidirectional current, wherein said rotatable support shaft is of electromagnetic material and the collar connected to the shaft forms an extension to the coil for positioning the shaft outside the magnetic flux of the magnetic means for driving the reflecting surface.

7. An apparatus for scanning infrared energy comprising, a reflecting surface, reflecting surface actuating means for actuating said reflecting surface and a magnetic means for driving said reflecting surface actuating means, said reflecting surface actuating means including a rotatable support shaft for rotating the reflecting surface in the optical path of the infrared energy, said magnetic means including coil means including an electrical coil and a collar interconnecting said coil and said support shaft and leads connected to said coil for connection to a surface of bidirectional current, wherein said coil is attached to said rotatable support shaft to form a free standing coil with respect to said magnetic means for driving said reflecting surface.

8. An apparatus for scanning infrared energy according to claim 7 wherein the magnetic means for driving the reflecting surface includes two permanent magnets having a pair of their magnetic poles in repelling positions and a center pole positioned between the magnetic poles, the permanent magnets supporting the center pole with the coil supported by the rotatable support shaft in a free standing position with respect to the center pole and magnets.

9. An apparatus for scanning infrared energy according to claim 8 wherein the magnetic means for driving the reflecting surface further includes a housing of electromagnetic material for containing the magnets, the housing having legs for supporting the center pole.

10. An apparatus for scanning infrared energy according to claim 9 wherein the housing includes a pair of "U" shaped members with their legs in a center pole supporting position.

* * * * *